United States Patent [19]

Grob

[11] 4,125,000
[45] Nov. 14, 1978

[54] TELESCOPIC TUBULAR POWER TRANSMITTING UNIT

[75] Inventor: Benjamin Grob, Cedarburg, Wis.

[73] Assignee: Grob, Inc., Grafton, Wis.

[21] Appl. No.: 751,047

[22] Filed: Dec. 14, 1976

[51] Int. Cl.² ............................ F16L 27/12; F16D 3/06
[52] U.S. Cl. ........................................ 64/23; 403/109;
403/359
[58] Field of Search ................... 64/23; 403/109, 359;
285/302

[56] References Cited

U.S. PATENT DOCUMENTS

| | | | |
|---|---|---|---|
| 1,705,625 | 3/1929 | Mitchell | 403/109 |
| 2,116,290 | 5/1938 | Spicer | 64/23 |
| 2,409,662 | 8/1944 | Christensen | 403/109 |
| 2,704,347 | 3/1955 | Doll | 403/109 |
| 2,757,002 | 6/1956 | Ryden | 403/109 |
| 2,772,547 | 12/1956 | Nolan | 64/23 |
| 3,474,833 | 10/1969 | Garrette | 285/302 |
| 3,491,555 | 1/1970 | Arndt | 64/23 |
| 3,519,291 | 7/1970 | Scott | 403/109 |
| 3,633,383 | 1/1972 | Kleinschmidt | 64/23 |
| 3,762,704 | 10/1973 | Gingras | 403/109 |

FOREIGN PATENT DOCUMENTS 1,089,640  9/1960  Fed. Rep. of Germany ............. 64/23

Primary Examiner—Benjamin W. Wyche
Assistant Examiner—R. C. Turner
Attorney, Agent, or Firm—Andrus, Sceales, Starke & Sawall

[57] ABSTRACT

A telescopic power transmitting unit. The power transmitting unit includes a tubular inner member having an outer longitudinal cylindrical section connected to a universal coupling and an inner splined section which is mounted for axial sliding movement within a central member having inner and outer splines extending the full length of the central member. An outer tubular member has an outer longitudinal cylindrical section connected to a universal coupling and an inner splined section which is mounted for sliding movement with respect to the outer spline of the central member. Circumferential guide rings are mounted on the inner and outer surfaces of the central member and aid in guiding the cylindrical sections of the inner and outer members relative to the central member and serve as stops to limit extension of the inner and outer members. A floating cylindrical shield is spaced radially outward of the outer member to prevent foreign material from contacting the splined sections.

11 Claims, 9 Drawing Figures

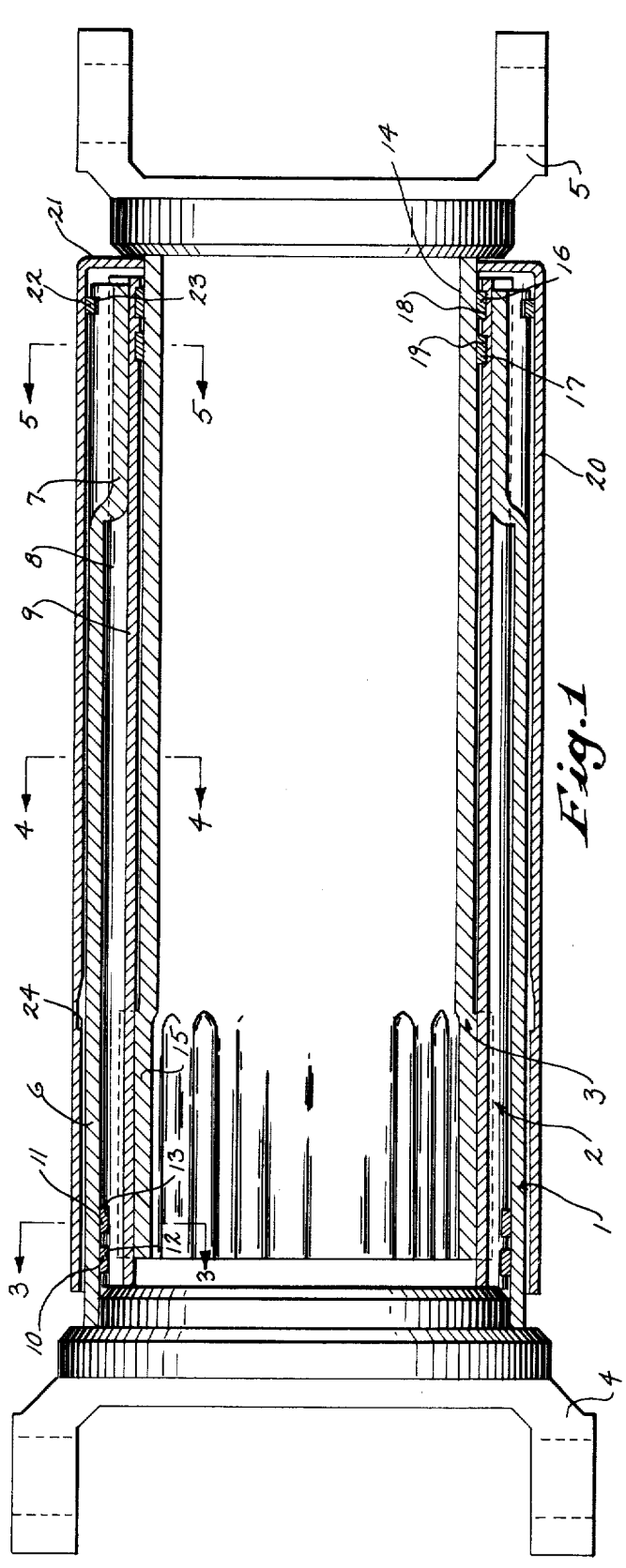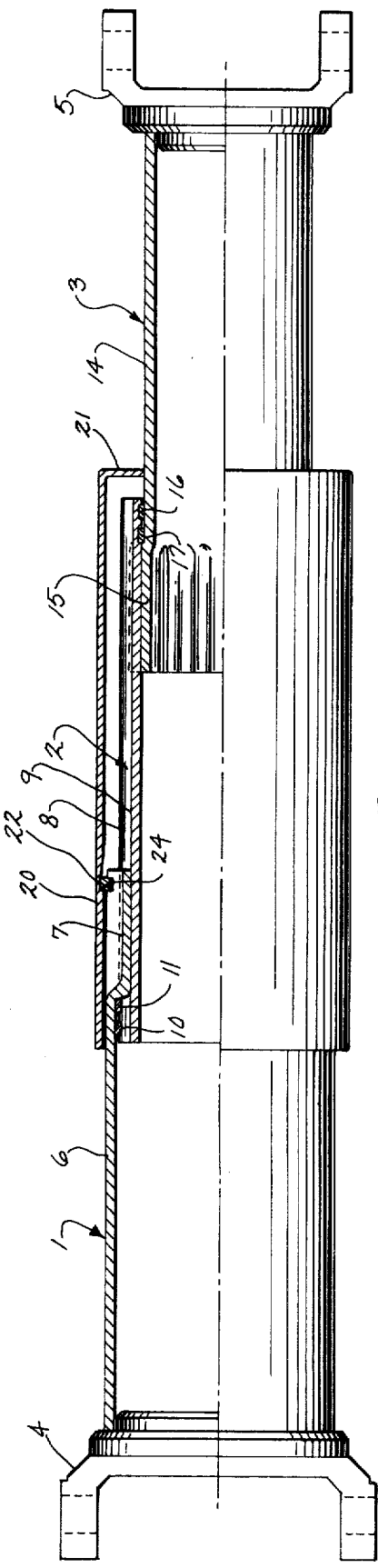

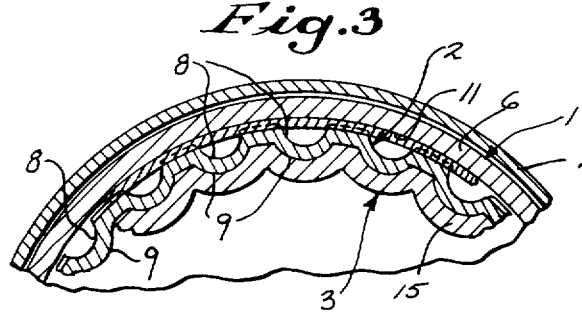
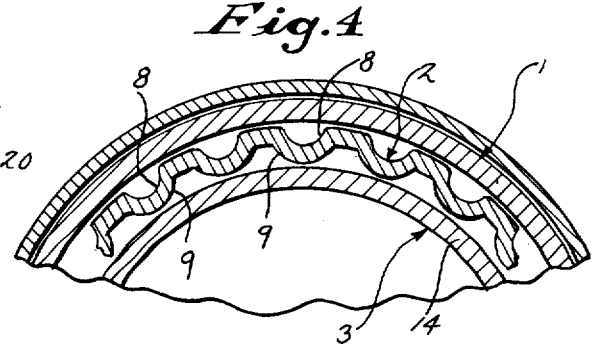
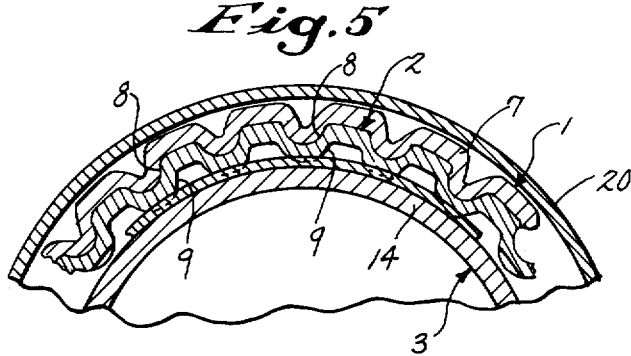
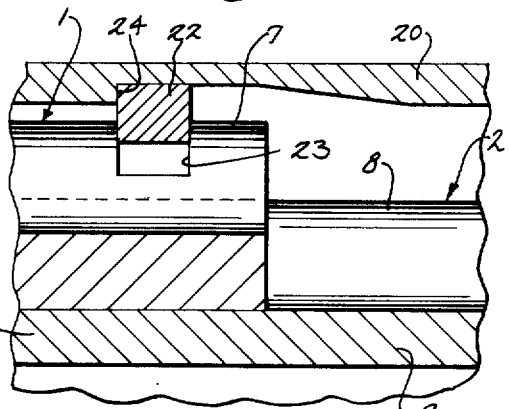
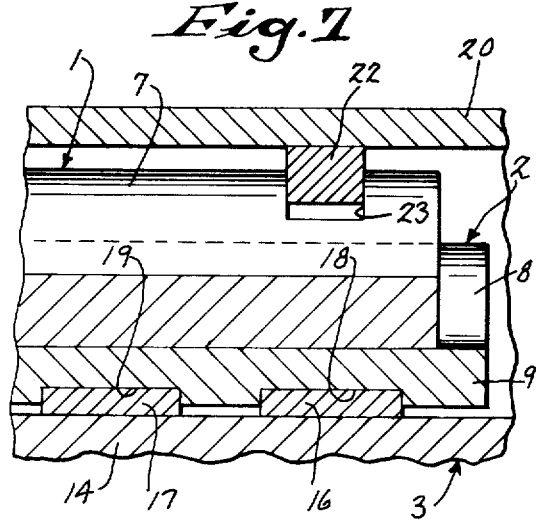
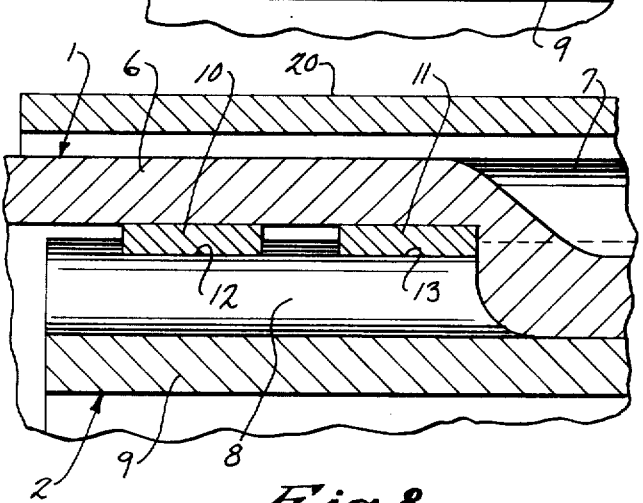
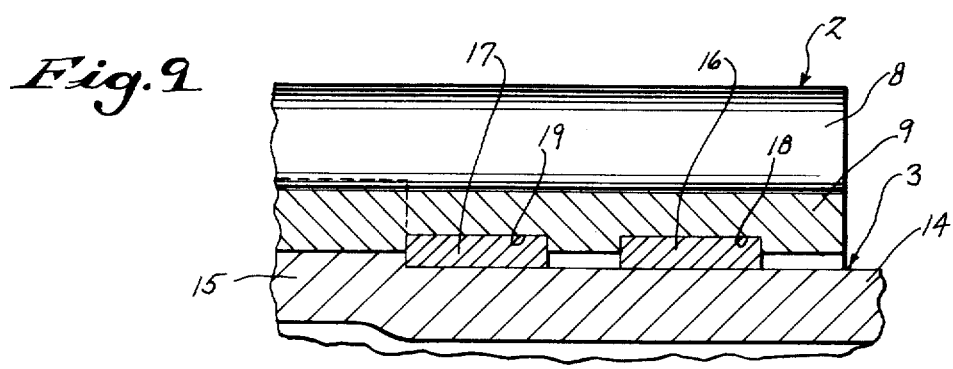

TELESCOPIC TUBULAR POWER TRANSMITTING UNIT

BACKGROUND OF THE INVENTION

Telescopic power transmission units are frequently used in off-road vehicles, such as tractors, logging equipment, heavy construction equipment, and the like. U.S. Pat. No. 3,293,884 describes a power transmitting unit composed of a pair of telescopic, tubular, splined or axially grooved members. The spline sections permit relative axial or telescopic movement between the members and yet provide a positive torque transmitting connection.

The use of hollow members or tubes in a power transmitting unit has distinct advantages in the design of a vehicle propeller shaft over the use of bar stock which is machined to provide the spline connection. Torque is best transmitted by tubular members, for under heavy reverse torque load and side load, the relatively large diameter tubular members will more effectively resist stress and increase the duration of use before failure. Furthermore, due to the inherent elasticity of the tubular member, the splined teeth can retreat or push out under torque load so that all of the spline teeth will be in engagement and take the load regardless of any possible inaccuracy in the formation of the teeth.

SUMMARY OF THE INVENTION

The invention relates to an improved telescopic power transmission unit composed of a series of tubular members or sections. In accordance with the invention, the power transmission unit includes an inner member having an outer longitudinal cylindrical section connected to a universal coupling, and an inner splined section which is mounted for axial sliding movement within a central member which has splines on both its inner and outer surfaces extending the full length of the central member.

An outer tubular member has an outer longitudinal cylindrical section connected to a universal coupling and an inner internally splined section which mates with the external spline on the central member. With this construction, both the inner and outer members can move axially with respect to the central member.

To aid in guiding the cylindrical sections of the inner and outer members relative to the central member, circumferential guide rings are mounted on the inner and outer surfaces of the central member. The cylindrical sections of the inner and outer members ride on the guide rings, and the guide rings also serve as stops to limit the extension of both the inner and outer members with respect to the central member.

A floating cylindrical shield is spaced radially outward of the outer member and serves to prevent dirt or other foreign material from contacting the splined sections during operation of the unit.

The power transmitting unit of the invention, being formed of hollow tubular members, provides a more positive transmission of torque and will more effectively resist stress, heavy reverse torque load and side load.

As the transmission unit is formed of at least three tubular members, a large extension is provided relative to the retracted length of the unit.

With the structure of the invention, there are no exposed splined sections, in either the retracted or extended positions, so that the tendency of the splined sections to be contaminated with dirt or foreign material is minimized. This is a particular advantage where the invention is utilized as a propeller shaft in off-road vehicles.

Other objects and advantages will appear in the course of the following description.

DESCRIPTION OF THE DRAWINGS

The drawings illustrate the best mode presently contemplated of carrying out the invention.

In the drawings:

FIG. 1 is a longitudinal section of the power transmitting unit of the invention in the retracted position;

FIG. 2 is a view similar to FIG. 1 showing the unit in the fully extended position;

FIG. 3 is a section taken along line 3—3 of FIG. 1;

FIG. 4 is a section taken along line 4—4 of FIG. 1;

FIG. 5 is a section taken along line 5—5 of FIG. 1;

FIG. 6 is an enlarged fragmentary longitudinal section showing the position of the outer member and the cylindrical shield when the outer member is in the extended position;

FIG. 7 is a view similar to FIG. 6 when the unit is in the retracted position;

FIG. 8 is an enlarged fragmentary section showing the guide rings for guiding the outer telescopic member; and FIG. 9 is an enlarged fragmentary section showing the guide rings for guiding the inner telescopic member.

DESCRIPTION OF THE PREFERRED EMBODIMENT

The drawings illustrate a power transmitting unit, such as a propeller shaft, which has particular application for use in heavy off-road equipment. The propeller shaft comprises a series of telescopic tubular members including an outer member 1, a central member 2, and an inner member 3. The outer end of the outer member 1 carries a universal coupling 4, and similarly the outer end of the inner member 3 carries a universal coupling 5.

The outer longitudinal section 6 of the outer member 1 has a generally cylindrical contour, while the inner longitudinal section 7 of the outer member is splined. As best shown in FIG. 2, the cylindrical section 6 has a substantially greater length than the splined section 7.

The central member 2 is formed with an external spline 8, which is engaged with the spline section 7 of the outer member, and an internal spline 9. The splines 8 and 9 of central member 2 extend the full length of the member.

To guide the outer member 1 in sliding movement relative to the central member 2, a pair of rings 10 and 11 are mounted within grooves 12 and 13 respectively, in the outer spline 8. The inner surface of the cylindrical section 6 is adapted to ride on the rings 10 and 11 as the outer member 1 is moved axially with respect to the central member 2. In addition to serving as a guide, the ring 11 serves as a stop to limit the extension of the outer member 1 with respect to the central member. As shown in FIG. 2, the end of the splined section 7 will engage ring 11 to limit further outward movement of outer member 1.

The use of the two rings 10 and 11 provides increased axial support length for the outer member when it is in the extended position, as shown in FIG. 2, and thereby achieves greater rigidity for the unit.

The inner member 3 includes an outer longitudinal cylindrical section 14, and an inner externally splined section 15, which is engaged with the inner spline 9 of central member 2.

A pair of rings 16 and 17 are mounted within grooves 18 and 19, respectively, in the inner spline 9, and rings 16 and 17 aid in guiding the inner member 3 in axial movement relative to the central member 2.

As in the case of the ring 11, the ring 16 serves an additional function as a stop, as shown in FIG. 2, to limit the outward extension of the inner member 3 relative to the central member 2. As shown in FIG. 2, the spline section 15 will engage the ring 17 to limit the outward movement of the inner member.

Spaced radially outward of the outer member 1 is a generally cylindrical shield 20. One end of the shield 20 is provided with an inwardly extending flange 21, which is adapted to ride against the outer surface of cylindrical section 14 as the inner member 1 is moved axially with respect to the central member 2. As the shield 20 is free floating, a ring 22 is mounted within a circumferential groove 23 in the splined section 7 of outer member 1 and engages a shoulder 24 formed in the inner surface of the shield to prevent movement of the shield in a direction toward the universal joint 5 when the unit is in the extended position as shown in FIG. 2. The shield acts to prevent dirt or foreign material from contacting the mating splined sections of the unit, and this feature is if importance because the power transmitting unit has particular use in off-road vehicles, such as tractors, heavy construction equipment, and the like.

The power transmitting unit of the invention provides a large extension relative to the retracted length of the unit, with the extended length being more than two times that of the retracted length.

With the power transmitting unit of the invention there are no exposed splines either in the retracted or extended position and this, along with the outer dirt shield 20, insures that dirt and foreign material will not contaminate the mating splined surfaces.

Various modes of carrying out the invention are contemplated as being within the scope of the following claims particularly pointing out and distinctly claiming the subject matter which is regarded as the invention.

I claim:

1. A telescopic power transmitting unit, comprising a tubular inner member having a generally cylindrical axial outer section and having an externally splined axial inner section disposed axially inward of said cylindrical section, a central member disposed radially outward of said inner member and having an internal spline and an external spline, said splines extending substantially the full length of said central member and said internal spline engaged with the splined section of the inner member, an outer member disposed radially outward of the inner member, an outer member disposed radially radially outward of said central member and having a generally cylindrical axial outer section and an internally splined axial inner section disposed axially inward of said last named cylindrical section and engaged with the external spline of the central member, said inner and outer members each being mounted for telescopic sliding movement with respect to the central member between retracted and extended positions, first universal coupling means connected to the outer end of the inner member, second universal coupling means secured to the outer end of the outer member, first guide means disposed between the cylindrical section of the inner member and the central member for guiding the cylindrical section of the inner member in sliding movement, first stop means for limiting axial outward telescopic movement of the inner member in said extended position whereat the splined section of the inner member is disposed wholly within the central member, second guide means disposed between the cylindrical section of the outer member and the central member for guiding the cylindrical section of the outer member in sliding movement, and second stop means for limiting axial outward telescopic movement of the outer member.

2. The unit of claim 1, wherein the splined section of the inner member extends less than one-half the length of said inner member, and the splined section of the outer member extends less than one half the length of the outer member.

3. The unit of claim 1, wherein said first and second guide means each comprise a circular ring secured to the respective inner and outer radial surfaces of the central member.

4. The unit of claim 1, wherein said first guide means comprises a ring disposed within a circumferential groove in the internal spline of the central member and said second guide means comprises a ring disposed within a circumferential groove in the external spline of said central member.

5. The unit of claim 1, wherein said first guide means comprises a pair of axially spaced rings secured to the internal spline of said central member and said second guide means comprises a pair of axially spaced rings secured to the external spline of said central member.

6. The unit of claim 1, and including a tubular shield disposed radially outward of said outer member said inner and outer members being movable axially relative to said shield, said shield acting to enclose the external spline of the central member when the outer member is in the extended position.

7. The unit of claim 6, and including a radially extending flange on one end of said shield and disposed to ride on the cylindrical section of the inner member as the inner member is moved axially with respect to the central member.

8. The unit of claim 6, wherein said shield has a length substantially equal to the distance between said first and second universal coupling means when the inner and outer members are in the retracted position.

9. The unit of claim 6, and including means for maintaining the shield in a spaced radially outward location with respect to the central member on extension and retraction of said inner and outer members.

10. A power transmitting unit, comprising a tubular inner member having a generally cylindrical axial outer section and having an externally splined axial inner section disposed axially inward of said cylindrical section, a central member having an internal spline and an external spline, said splines extending substantially the full length of said central member and said internal spline engaged with the splined section of the inner member, and outer member having a generally cylindrical axial outer section and an internally splined axial inner section disposed axially inward of said last named cylindrical section and engaged with the external spline of the central member, said inner and outer members being mounted for telescopic sliding movement with respect to the central member between retracted and extended positions, first universal coupling means connected to the outer end of the inner member, second universal coupling means secured to the outer end of the outer member, first guide ring means disposed within a circumferential groove in the internal spline of the central member and disposed to ride against the cylindrical section of the inner member as said inner member is moved axially with respect to the central member, said first guide ring means being disposed adjacent an end of said central member, said first guide ring means disposed to be engaged by the end of the splined section of said inner member to limit outward telescopic movement of said inner member in said extended position whereat the splined section of the inner member is disposed wholly within the central member, and second guide ring means located adjacent the opposite end of the central member and disposed within a circumferential groove in the external spline of said central member, said second guide ring means disposed to ride against the cylindrical section of the outer member on axial movement of said outer member relative to said central member, engagement of the end of said splined section of the outer member with said second guide ring means serving as a stop to limit outward telescopic movement of said outer member relative to said central member, a tubular shield disposed radially outward of said outer member, said inner and outer members being movable axially relative to said shield, said shield having a length substantially equal to the distance between said first and second universal coupling means when the inner and outer members are in the retracted position, and said unit having means for maintaining the shield in a spaced radially outward location with respect to the central member on extension and retraction of said inner and outer members.

11. The unit of claim 10, wherein said first and second guide ring means each comprises a pair of axially spaced guide rings, said rings projecting radially beyond the respective surfaces of said central member.

* * * * *

UNITED STATES PATENT AND TRADEMARK OFFICE
CERTIFICATE OF CORRECTION

PATENT NO. : 4,125,000
DATED : November 14, 1978
INVENTOR(S) : BENJAMIN GROB

It is certified that error appears in the above—identified patent and that said Letters Patent are hereby corrected as shown below:

Column 3, line 56, CLAIM 1, Cancel "an outer member disposed radially out-", Column 3, Line 57, CLAIM 1, Cancel "ward of the inner member,", Column 3, line 58, CLAIM 1, Cancel "radially" (second occurrence).

Signed and Sealed this

Twelfth Day of June 1979

[SEAL]

Attest:

RUTH C. MASON
Attesting Officer

DONALD W. BANNER
Commissioner of Patents and Trademarks